United States Patent
Dadu et al.

(10) Patent No.: US 10,325,083 B2
(45) Date of Patent: Jun. 18, 2019

(54) WEARABLE ELECTRONIC DEVICES

(71) Applicant: Intel Corporation, Santa Clara, CA (US)

(72) Inventors: Saurabh Dadu, Tigard, OR (US); Swarnendu Kar, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/812,748

(22) Filed: Nov. 14, 2017

(65) Prior Publication Data

US 2018/0225436 A1    Aug. 9, 2018

Related U.S. Application Data

(63) Continuation of application No. 14/317,443, filed on Jun. 27, 2014, now Pat. No. 9,817,959.

(51) Int. Cl.
| | |
|---|---|
| *G06F 21/32* | (2013.01) |
| *H04L 29/06* | (2006.01) |
| *H04W 4/80* | (2018.01) |
| *H04W 12/06* | (2009.01) |

(52) U.S. Cl.
CPC .......... *G06F 21/32* (2013.01); *H04L 63/0861* (2013.01); *H04W 4/80* (2018.02); *H04W 12/06* (2013.01)

(58) Field of Classification Search
CPC ..... G06F 21/32; H04W 12/06; H04L 63/0861
See application file for complete search history.

(56) References Cited

U.S. PATENT DOCUMENTS

| | | | |
|---|---|---|---|
| 9,762,581 B1 | 9/2017 | Wang et al. | |
| 2005/0221798 A1* | 10/2005 | Sengupta | H04M 1/67 455/411 |
| 2008/0129465 A1* | 6/2008 | Rao | A61B 5/0031 340/286.02 |

(Continued)

FOREIGN PATENT DOCUMENTS

| | | |
|---|---|---|
| CN | 20404460 U | 12/2014 |
| EP | 2378748 A1 | 10/2011 |
| EP | 3118762 A1 | 1/2017 |
| WO | 2012-170366 A1 | 12/2012 |
| WO | 2015-199879 A1 | 12/2015 |

OTHER PUBLICATIONS

Final Office Action issued in U.S. Appl. No. 14/317,443, dated Sep. 8, 2016, 19 pages.

(Continued)

*Primary Examiner* — Robert B Leung
*Assistant Examiner* — Thomas Ho
(74) *Attorney, Agent, or Firm* — Grossman, Tucker, Perreault & Pfleger, PLLC

(57) ABSTRACT

Wearable electronic device technology is disclosed. In an example, a wearable electronic device can include a handling portion that facilitates donning the wearable electronic device on a user. The wearable electronic device can also include a user authentication sensor associated with the handling portion and configured to sense a biometric characteristic of the user while the user is donning the wearable electronic device. In addition, the wearable electronic device can include a security module to determine whether the sensed biometric characteristic indicates an authorized user of the wearable electronic device.

14 Claims, 6 Drawing Sheets

(56) References Cited

U.S. PATENT DOCUMENTS

| | | |
|---|---|---|
| 2009/0146947 A1 | 6/2009 | Ng |
| 2011/0214158 A1 | 9/2011 | Pasquero et al. |
| 2011/0221568 A1 | 9/2011 | Giobbi |
| 2012/0316455 A1 | 12/2012 | Rahman et al. |
| 2012/0317024 A1 | 12/2012 | Rahman et al. |
| 2014/0049487 A1 | 2/2014 | Konertz et al. |
| 2014/0089672 A1 | 3/2014 | Luna et al. |
| 2014/0089673 A1* | 3/2014 | Luna ............... H04L 63/0861 713/186 |
| 2014/0142403 A1* | 5/2014 | Brumback ......... A61B 5/02433 600/324 |
| 2014/0143064 A1 | 5/2014 | Tran |
| 2014/0279528 A1* | 9/2014 | Slaby .............. H04L 63/0853 705/44 |
| 2015/0028996 A1 | 1/2015 | Agrafioti et al. |
| 2015/0070134 A1* | 3/2015 | Nagisetty ........... G07C 9/00111 340/5.61 |
| 2015/0223731 A1 | 8/2015 | Sahin |
| 2015/0324568 A1* | 11/2015 | Publicover ............ G06F 21/64 726/19 |
| 2015/0381609 A1 | 12/2015 | Dadu et al. |
| 2016/0034679 A1 | 2/2016 | Yun et al. |
| 2017/0339137 A1* | 11/2017 | Vanoni .................... H04N 5/33 |

OTHER PUBLICATIONS

Final Office Action issued in U.S. Appl. No. 14/317,443, dated Dec. 16, 2015, 16 pages.
Notice of Allowance issued in U.S. Appl. No. 14/317,443, dated Jul. 12, 2017, 12 pages.
Office Action issued in U.S. Appl. No. 14/317,443, dated Jan. 17, 2017, 20 pages.
Office Action issued in U.S. Appl. No. 14/317,443, dated May 20, 2016, 16 pages.
Office Action issued in U.S. Appl No. 14/317,443, dated Jun. 3, 2015, 15 pages.
European Extended Search Report and Communication issued in European Application No. 15811622.8, dated Feb. 9, 2018, 8 pages.
International Search Report and Written Opinion issued in PCT Application No. PCT/US2015/032682, dated Aug. 26, 2015, 14 pages.
International Preliminary Report on Patentability and Written Opinion issued in PCT Application No. PCT/US2015/032682, dated Dec. 27, 2016, 10 pages.
Office Action received in Chinese Patent Application No. 201580027743.0, dated Nov. 23, 2018, 19 pages.

* cited by examiner

WEARABLE ELECTRONIC DEVICES

TECHNICAL FIELD

Embodiments described herein relate generally to wearable electronic devices.

BACKGROUND

Personal digital assistants and cellular phones are both examples of popular personal computing devices. A fairly recent development in this area has been wearable computing technology. The goal of wearable computing technology involves the miniaturization of computer system components to a point where the components themselves can be worn easily and inconspicuously in much the same way as clothing or jewelry.

In addition, many personal computing devices are configured to operate in an authentication or security mode, in which an authentication password or code is required to enable the device to perform functions such as sending messages (e.g., email, SMS, MMS, etc.), placing a phone call, navigating device menus (e.g., accessing the device memory, changing device settings, etc.), or running a device application (e.g., business, entertainment, finance, games, music/audio, video, maps/navigation, reference, shopping, sports/recreation, travel, utilities, weather, etc.). After a time-out period or event (e.g., a menu option to enter the security mode, auto off, etc.), the device is disabled and a password is again required the next time access to a device function(s) is desired. Such device "locking" advantageously helps to prevent unauthorized access to device functions in the event that the device is lost or stolen.

BRIEF DESCRIPTION OF THE DRAWINGS

Invention features and advantages will be apparent from the detailed description which follows, taken in conjunction with the accompanying drawings, which together illustrate, by way of example, various invention embodiments; and, wherein.

Figure 1:
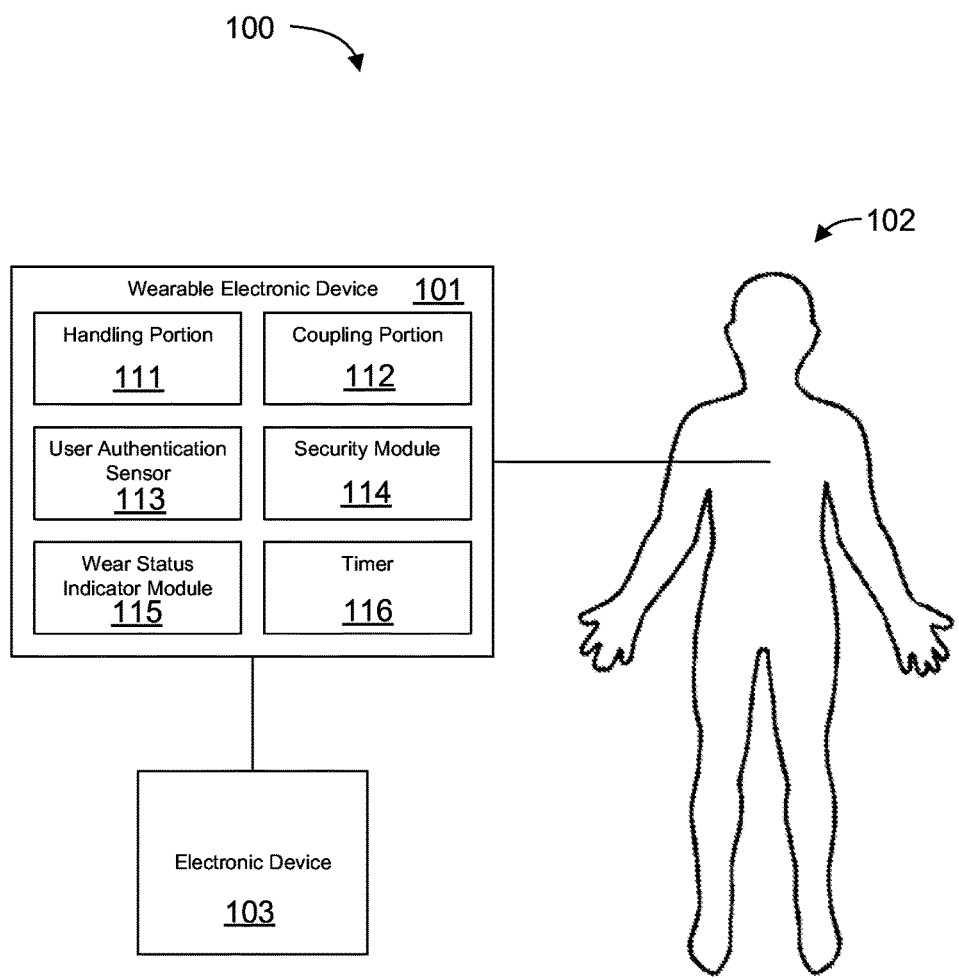
FIG. 1 illustrates an electronic device authentication system in accordance with an example of an invention embodiment.

Reference will now be made to the exemplary embodiments illustrated, and specific language will be used herein to describe the same. It will nevertheless be understood that no limitation of the scope or to specific invention embodiments is thereby intended.

DESCRIPTION OF EMBODIMENTS

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a sensor" includes a plurality of such sensors.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly but is not intended to identify key or essential features of the technology nor is it intended to limit the scope of the claimed subject matter.

As electronic devices, such as wearable electronic devices, become increasingly prevalent in numerous aspects of modern life, there is a desire to make these devices more intelligent, more efficient, more intuitive, and/or less obtrusive. While an authentication or security mode is important to prevent unauthorized access to personal electronic device functions, it may be cumbersome to repeatedly enter a password or code each time access to the device is required, which may amount to dozens of times a day for corporate or high frequency users, thus proving obtrusive and hindering efficiency. Moreover, it is generally recommended that passwords or codes be several characters long to enhance security and decrease the chance of the password being guessed, with mixed letter and number codes providing the greatest security. However, the use of long and complicated passwords or codes only leads to greater frustration when they have to be entered on such a frequent basis. This may be particularly so on some devices that have relatively small keys or touch screens, which may increase the difficulty of entering the characters.

Certain invention embodiments provide a user authentication sensor configured to sense a biometric characteristic of the user in response to an action taken by the user to don a wearable electronic device, such as a natural motion by the user in donning the wearable electronic device. Generally, a natural motion can be a motion made by a user or wearer in handling an article to be donned and which is meant to be made in order to don the article. Such movements often flow from or are otherwise dictated or driven by the shape and form of the article. For example, the user authentication sensor can be located on a handling portion of the wearable electronic device that is meant or designed to be handled during the donning of the article. For example, a handling portion, segment, or part of a device can be a portion that is either specifically meant to be engaged, touched, or handled, or that is conveniently engaged, touched, or handled by the user in handling or holding the device while not worn by the user, or when donning the article. Placing the sensor thusly can facilitate sensing of at least a portion of a hand of the user as the user manipulates the wearable electronic device in donning the device. In the case of a watch or wrist-worn wearable electronic device, for example, a natural motion may be grasping a wrist band with the fingers and then wrapping the wrist band around the wrist and fastening a clasp or securing a buckle. A natural motion can also be a motion or movement that results in placement of an article on a user in a location and manner intended for the article's use and operation. For example, with respect to optical wear (e.g. eye glasses) a sensor can be placed on the inside of the distal end of an earpiece so that it engages a location or anatomy of the user behind the ear when donned. Additionally, a sensor placed on the inside of a watch may be located so as to press against the inside of a wrist over veins that allow a pulse or vein pattern to be detected by the sensor.

Referring to FIG. 1, an exemplary electronic device authentication system 100 is illustrated. The system 100 can include a wearable electronic device 101 that can be worn by a user 102. The system can further include an electronic device, or remote electronic device 103. Typically, an "electronic device" will include a "computer," which is a general purpose device that can be programmed to carry out a finite set of arithmetic or logical operations. Such functionality, however, is not required. A computer can include a processing element, typically a central processing unit (CPU), and some form of memory. Typical components of an electronic device may include, but are not limited to, persistent memories like flash ROM, random access memory like SRAM, a camera, a battery, LCD driver, a display, user interface controls (i.e., a dial, a push button, a switch, or other such control depending upon the desired functionality), a cellular antenna, a speaker, Bluetooth® circuitry, WiFi circuitry, and/or RF circuitry, where the persistent memory may contain programs, applications, and/or an operating system for the mobile device. The electronic device or remote electronic device 103 can include, but is not limited to, a desktop computer, a laptop computer, a mobile device, a server, etc. Examples of a mobile device include, but are not limited to, a cell phone such as a smart phone, a tablet computer, a personal digital assistant (PDA), or any other suitable portable electronic device. A "wearable electronic device" is any electronic device that can be worn by a user and not merely held in a user's hand like a mobile electronic device. Exemplary wearable electronic devices can be configured as a watch, a bracelet, a wristband, an arm band, a ring, an eyeglass, a pair of eyeglasses, a goggle, a pair of goggles, a health tracker, an activity tracker, a headband, a headset, a headphone, an earbud, a hat, a cap, a helmet, a wig, a hairpiece, a pant, a short, a skirt, a blouse, a dress, a shirt, a jacket, a coat, a vest, a shoe, a boot, a slipper, a necktie, a belt, a sock, an undergarment, an earring, a necklace, a backpack, a purse, a hearing aid, body jewelry, or combinations thereof.

Although the wearable electronic device 101 can be a "stand alone" device, the wearable electronic device can be configured to communicate with a variety of other electronic devices, such as the electronic device 103. For example, either one of the wearable electronic device 101 and the electronic device 103 can function as a server and can process and interchange data to the other "client" device. In this way, the wearable electronic device 101 may communicate with several client devices and may control these devices or be controlled by these devices.

An electronic device may be configured to operate in an authentication or security mode, in which authentication of the user is required to enable the device to perform functions, such as sending messages (e.g., email, SMS, MMS, etc.), placing a phone call, navigating device menus (e.g., accessing the device memory, changing device settings, etc.), or running a device application (e.g., business, entertainment, finance, games, music/audio, video, maps/navigation, reference, shopping, sports/recreation, travel, utilities, weather, etc.). A user may be authenticated by entering an authentication password or code, and/or by a biometric characteristic, such as a physiological characteristic (i.e., a fingerprint, a palm print, hand geometry, iris recognition, retina recognition, scleral recognition, a pulse rate, a vein pattern, skin cell pattern, skin temperature, a bodily electric or magnetic field, hair pattern, dermal thickness, skin pigmentation type), chemical characteristic (i.e., DNA, odor, moisture composition, blood content), and/or a behavioral characteristic (i.e., gait, voice, muscle inflection, etc.). Thus, for example, once the required authentication procedure has been completed, the wearable electronic device 101 can send and receive communications signals over a communication network, such as with the electronic device 103. In one aspect, upon authentication of the user, the wearable electronic device 101 can initiate an action with the electronic device 103, such as pairing, pulling emails/messages/alerts from the device, and pushing sensor information onto the device.

The wearable electronic device 101 will typically include a handling portion 111 that facilitates donning the wearable electronic device on the user 102, such as a portion of a watch, a headset, a headphone, or a pair of eyeglasses, as discussed in more detail below. In one aspect, the handling portion can include any suitable type of support structure that facilitates wearing the wearable electronic device on a limb, head, torso, or other portion of a wearer. In another aspect, the handling portion 111 can comprise a coupling portion 112 of the wearable electronic device that facilitates maintaining the device about the user. As used herein, a "coupling portion" is any structure, feature, or surface that facilitates maintaining an article about a wearer.

The wearable electronic device 101 can also include a user authentication sensor 113 associated with the handling portion 111. The user authentication sensor can comprise a fingerprint sensor, an optical sensor, a camera, an ultrasonic sensor, a capacitance sensor, a passive capacitance sensor, an active capacitance sensor, an iris pattern sensor or a finger/palm vein pattern sensor. The user authentication sensor 113 can be configured to sense a biometric characteristic of the user 102 while the user is donning the wearable electronic device 101. In one aspect, the user authentication sensor 113 can be configured to sense the biometric characteristic in response to an action taken by the user to don the wearable electronic device 101. In a particular aspect, the user authentication sensor can be located on the handling portion to facilitate sensing of at least a portion of a hand of the user as the user naturally manipulates the wearable electronic device in donning the device. Thus, for example, the user can be authenticated in an unobtrusive manner as a result of a natural motion or action typically executed by the user to don the wearable device. In other words, user authentication can be coupled or integrated with the act of donning the wearable electronic device. The location of the user authentication sensor 113 on the handling portion 111 can facilitate user authentication without the user performing any additional action or motion necessary to don the wearable electronic device. The user can therefore be authenticated automatically as the wearable electronic device is donned, thus making the device ready for use by the user when the device is worn, without the need for independent and additional authentication actions or steps.

The wearable electronic device 101 can include a security module 114 to determine whether the sensed biometric characteristic indicates an authorized user of the wearable electronic device 101. For example, in the case of a fingerprint sensor, a digital image of the fingerprint pattern can be captured and digitally processed to create a biometric template (i.e., a collection of extracted features), which can be stored and used for matching with future fingerprint scans. The security module can determine whether a scanned fingerprint matches a stored fingerprint to authenticate the user. In one aspect, the user authentication sensor 113 and/or the security module 114 can be enabled or disabled, as desired, by the user. Thus, for example, when disabled, the user can operate the wearable electronic device 101 without authentication.

In one aspect, the wearable electronic device 101 can include a wear status indicator module 115 to determine whether the wearable electronic device is being worn. In this case, the security module 114 can be configured to deny authorization when the wearable electronic device 101 is not worn. For example, functionality of the wearable electronic device can be automatically locked or disabled when the user removes the device. In another aspect, the wearable electronic device 101 can include a timer 116 to enable authentication of the user 102 when the wear status indicator 115 indicates that the wearable electronic device is being worn within a predetermined time period following the receipt of the biometric information by the user authentication sensor 113. The timer 116 can therefore facilitate user authentication when the user authentication sensor 113 has sensed biometric information prior to an indication by the wear status indicator module 115 that the device is being worn.

Figure 2:
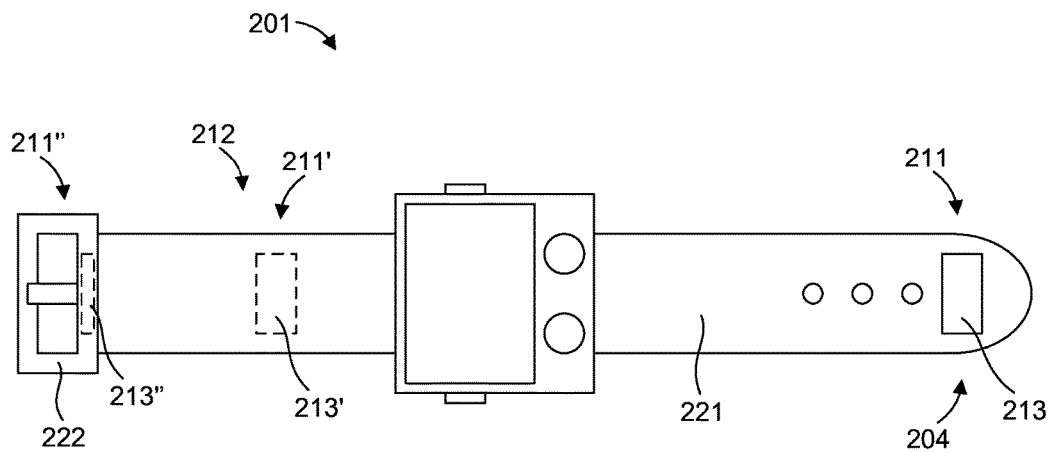
FIG. 2 illustrates a wearable electronic device in accordance with an example of an invention embodiment.

FIG. 2 illustrates a wearable electronic device 201 in accordance with an example of the present disclosure. In this case, the wearable electronic device 201 can include a coupling feature 212 configured, at least in part, as a wristband 221 and a buckle 222 to facilitate securing the wearable electronic device about a wrist of the user. In one aspect, a handling portion 211 can comprise at least a portion of the wristband, such as an end 204 of the wristband where the user is likely to touch with a finger while securing the end of the wristband with the buckle, and a user authentication sensor 213 can be located on the handling portion 211. Thus configured, the user authentication sensor 213 can be operable to sense a biometric characteristic of the user, such as a fingerprint, a palm print, hand geometry, a pulse rate, a vein pattern, DNA, and/or odor, while the user is donning the wearable electronic device 201. In other words, the user authentication sensor 213 can sense the biometric characteristic in response to the user's natural motion or action to don the wearable electronic device without requiring the user to take any extra steps or "go out of the way" to initiate authentication. In this way, the user can be authenticated in an efficient and unobtrusive manner that may even occur without the user's express intent to authenticate, simply by manipulating the wearable electronic device in order to don the device. The device can therefore be authenticated as a result of, and in the process of, donning the wearable electronic device.

It should be recognized that a handling portion can comprise any suitable portion of the wristband and/or the buckle (i.e., handling portions 211', 211"), and that a user authentication sensor (i.e., sensors 213', 213") can be located thereon to facilitate authentication of a user as the user naturally handles or manipulates a wearable electronic device in donning the device. In one aspect, a sensing direction of the user authentication sensor can be directed outwardly from the coupling feature, such as the wristband and/or the buckle, to facilitate exposure of a digit of the user to the user authentication sensor when donning the wearable electronic device. To accomplish this, the user authentication sensor can be disposed on an external portion of the coupling feature.

Figure 3:
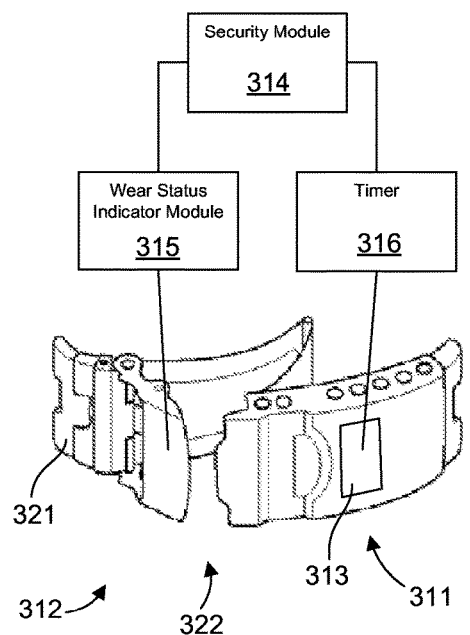
FIG. 3 illustrates aspects of a wearable electronic device in accordance with another example of an invention embodiment.

FIG. 3 illustrates a coupling feature 312 of a wearable electronic device in accordance with an example of the present disclosure. In this case, the coupling feature 312 can include a wristband 321 and a clasp 322 operable with the wristband to secure the wearable electronic device about a wrist of the user. In one aspect, a handling portion 311 can comprise at least a portion of the wristband and/or the clasp. A user authentication sensor 313 can be associated with the handling portion 311 and configured to sense a biometric characteristic as the user dons the wearable electronic device. The clasp 322 can have an open position and a closed position. A wear status indicator module 315 can indicate that the wearable electronic device is being worn when the clasp is in the closed position. In one aspect, the wear status indicator module can comprise a general-purpose input/output (GPIO) pin associated with the clasp to determine whether the clasp is in the closed position. In another aspect, the mating portions of the clasp can define an electrical switch, where closing the clasp can form a closed circuit and opening the clasp can open the circuit. It should be noted that other configurations may be used, such as a magnetic (e.g., Hall effect) sensor or mechanical interlocking arrangement, etc., to determine whether the clasp is in the closed position.

In general, an item that can be in one of two physical states (e.g., open/closed, on/off, buttoned/unbuttoned, tied/untied, etc.) and where the user cannot part with or remove the item without switching the state may be suitably monitored by the wear status indicator module. Thus, a wearable electronic device configured as a belt, a piece of jewelry, or an article of clothing (i.e., a shirt, pants, or shoes) can include a wear status indicator module to monitor whether the device is being worn, such as by monitoring a buckle, clasp, button, snap, zipper, a tie, shoelaces, etc.

With a wear status indicator module 315 to determine whether the wearable electronic device is being worn, a security module 314 can be configured to deny authorization when the wearable electronic device is not worn. In one aspect, a timer 316 can be used to enable authentication of the user when the wear status indicator 315 indicates that the wearable electronic device is being worn within a predetermined time period following the receipt of the biometric information by the user authentication sensor 313.

Figure 4:
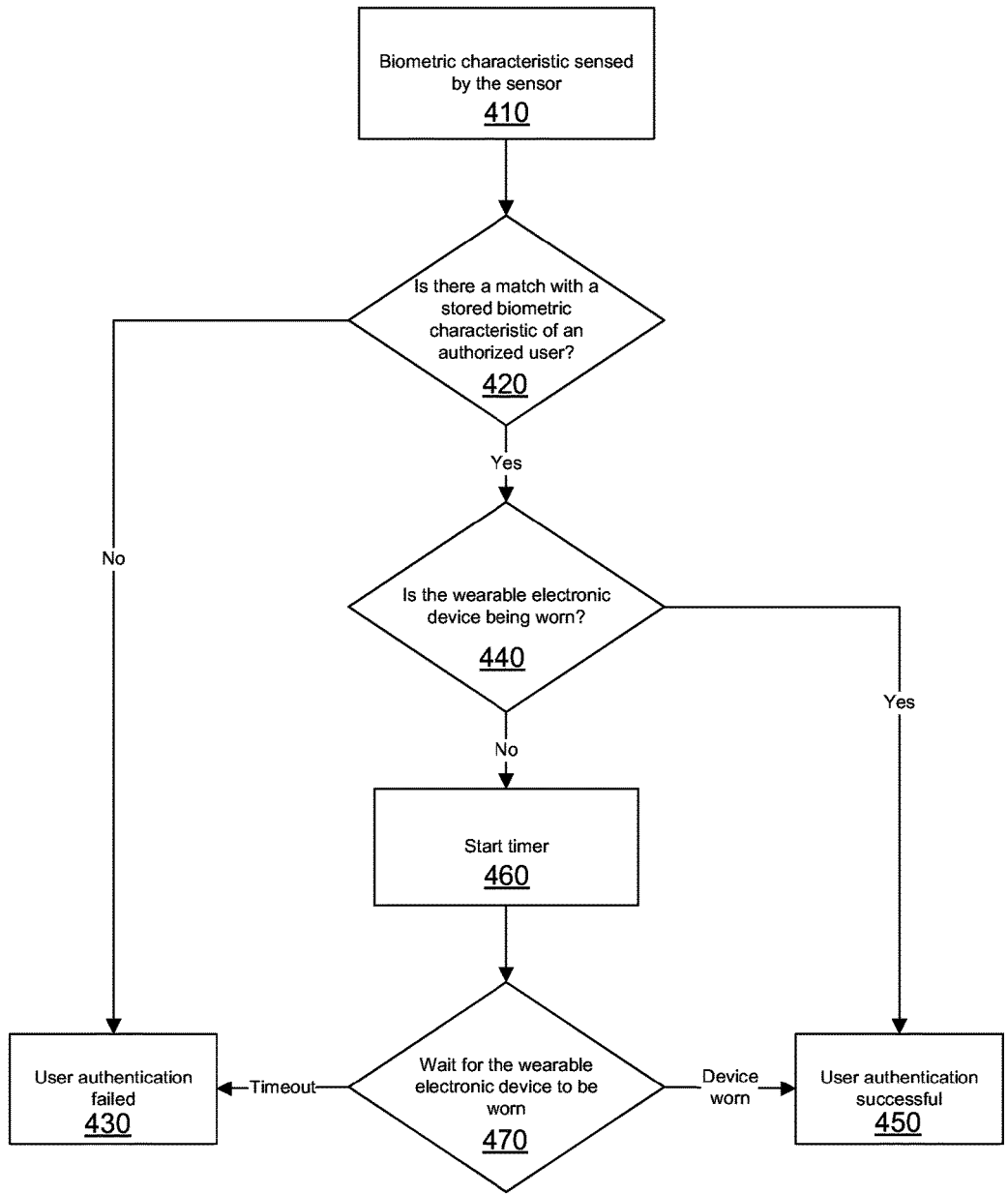
FIG. 4 is a flowchart that illustrates authentication of a wearable electronic device in accordance with an example of an invention embodiment.

For example, FIG. 4 illustrates a flowchart demonstrating user authentication for a wearable electronic device configured as in FIG. 3. Following sensing of a biometric characteristic by the sensor 410, the security module can determine whether there is a match with a stored biometric characteristic of an authorized user 420. If not, then the user is not authenticated 430. If so, then the wear status indicator module determines whether the device is being worn 440. If so, then the user is authenticated 450. If not, then the timer is started 460 to provide a limited time for the wear status indicator to determine that the device is being worn 470, such as when a fingerprint is scanned prior to closing a clasp. If the wear status indicator to determine that the device is being worn prior to the expiration of the timer, then the user is not authenticated 430. If, on the other hand, the wear status indicator determines that the device is being worn prior to the expiration of the timer, then the user is authenticated 450.

Figure 5:
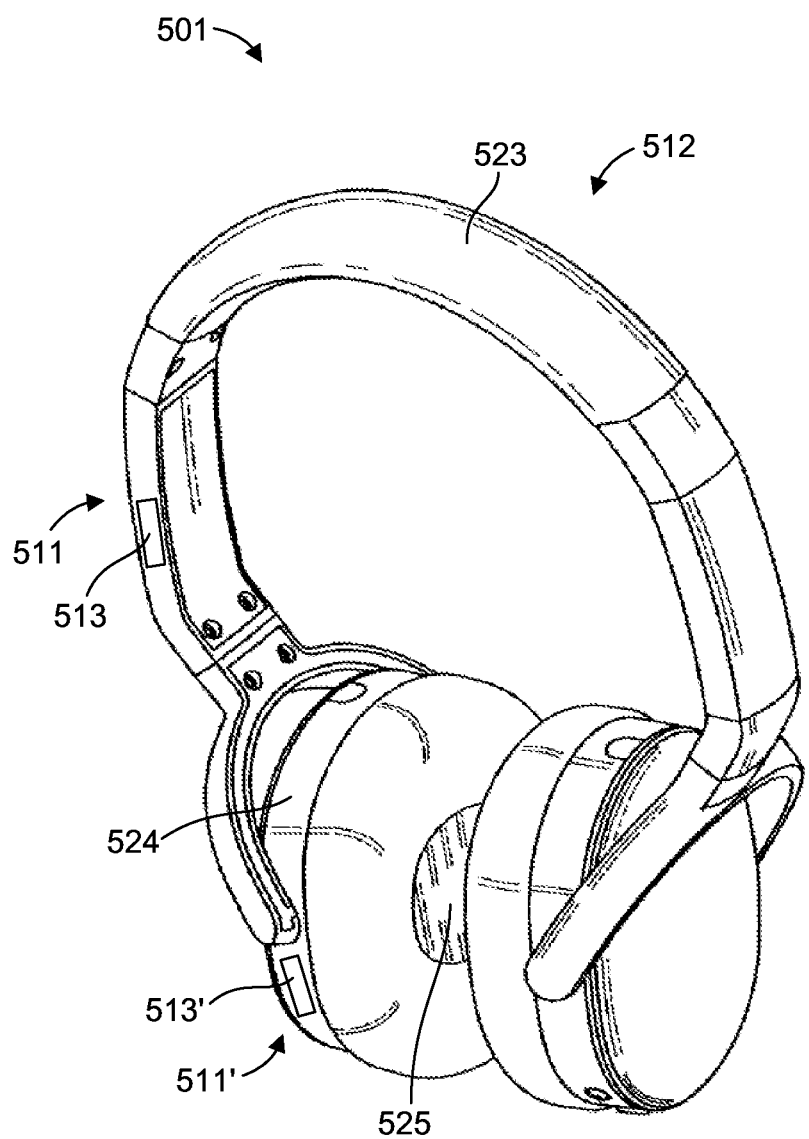
FIG. 5 illustrates a wearable electronic device in accordance with yet another example of an invention embodiment.

FIG. 5 illustrates a wearable electronic device 501 in accordance with another example of the present disclosure. In this case, the wearable electronic device 501 can include a coupling feature 512 configured as a headband 523 and an earphone 525 coupled to the headband 523 to facilitate securing the wearable electronic device about a head of the user. In one aspect, a handling portion 511 can comprise at least a portion of the headband 523. A user authentication sensor 513 can be associated with the handling portion 511 and configured to sense a biometric characteristic as the user dons the wearable electronic device 501. The earphone 524 can be operable with the headband 523 to facilitate positioning an ear speaker 525 proximate an ear of the user. In one aspect, a handling portion 511' can comprise at least a portion of the earphone 524 and a user authentication sensor 513' can be associated with the handling portion 511'. Thus, a handling portion of the wearable electronic device 501 can be any suitable location where the user may grasp or manipulate the device while donning the device, such as a portion of the headband 523 and/or the earphone 524.

In some embodiments, the wearable electronic device 501 can include a microphone boom coupling a microphone (not shown) to the headband and/or the earphone. The microphone boom can be operable to facilitate positioning the microphone proximate a mouth of the user. In one aspect, a handling portion can comprise a portion of the microphone boom and a user authentication sensor can be associated with the handling portion.

Figure 6:
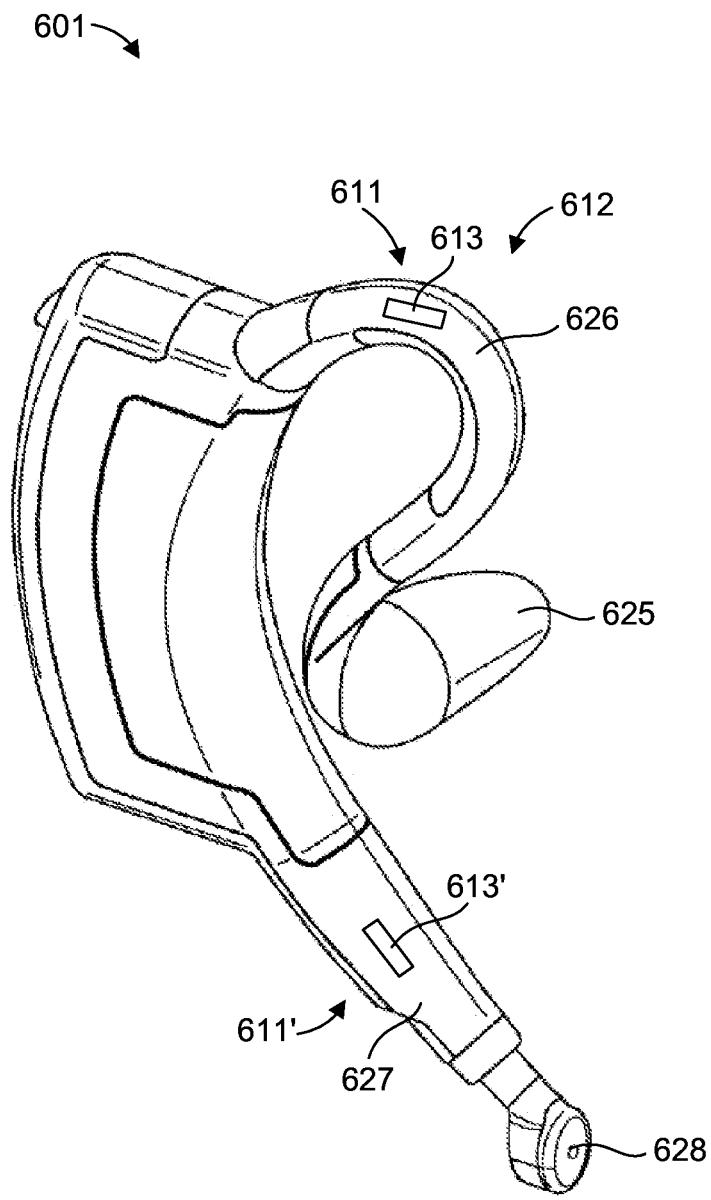
FIG. 6 illustrates a wearable electronic device in accordance with a further example of an invention embodiment.

FIG. 6 illustrates a wearable electronic device 601 in accordance with a yet another example of the present disclosure. In this case, the wearable electronic device 601 can include a coupling feature 612 configured as an earpiece 626 to facilitate securing the wearable electronic device about a head of the user. The wearable electronic device 601 can also include an ear speaker 625 coupled to the earpiece 626 configured to be proximate an ear of the user. In one aspect, a handling portion 611 can comprise at least a portion of the earpiece 626. A user authentication sensor 613 can be associated with the handling portion 611 and configured to sense a biometric characteristic as the user dons the wearable electronic device 601 by positioning the earpiece behind the ear of the user.

The wearable electronic device 601 can also include a microphone boom 627 coupling a microphone 628 to the earpiece 626. The microphone boom 627 can be operable to facilitate positioning the microphone 628 proximate a mouth of the user. In one aspect, a handling portion 611' can comprise a portion of the microphone boom 627 and a user authentication sensor 613' can be associated with the handling portion 611'. Thus, a handling portion of the wearable electronic device 601 can be any suitable location where the user may grasp or manipulate the device while donning the device, such as a portion of the earpiece 626 and/or the microphone boom 627.

Figure 7:
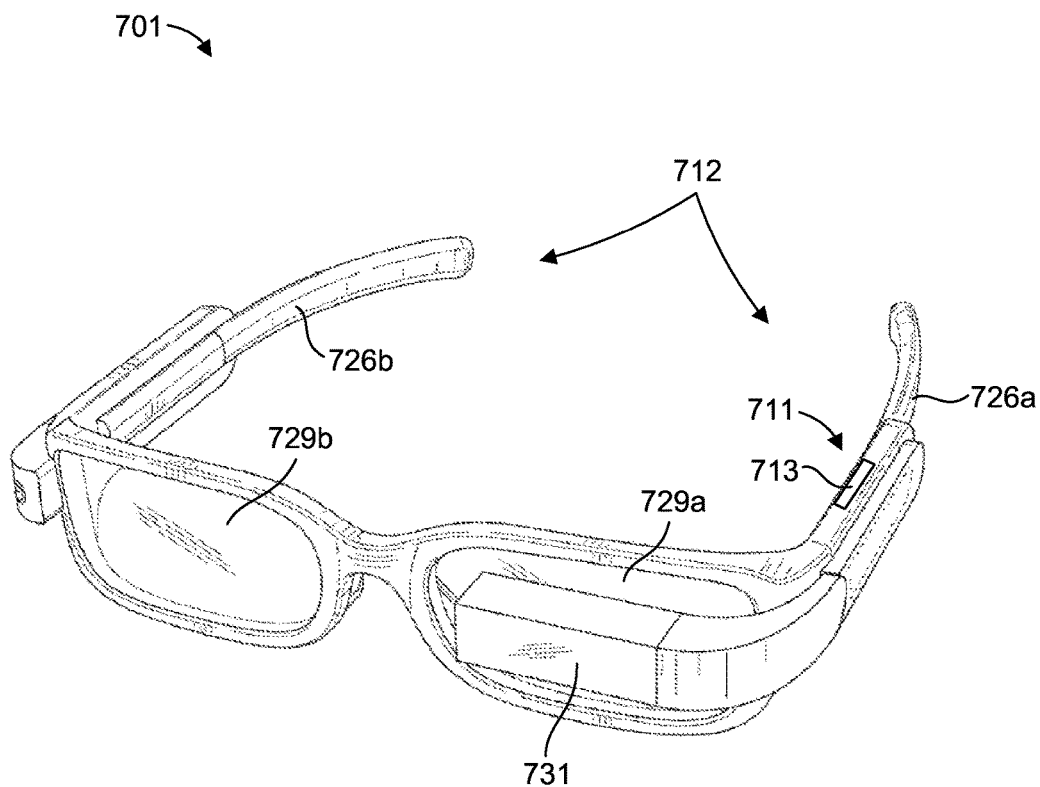
FIG. 7 illustrates a wearable electronic device in accordance with still another example of an invention embodiment.

FIG. 7 illustrates a wearable electronic device 701 in accordance with still another example of the present disclosure. In this case, the wearable electronic device 701 can include a coupling feature 712 configured as a pair of earpieces 726a, 726b to facilitate securing the wearable electronic device about a head of the user. The wearable electronic device 701 can also include a pair of lenses 729a, 729b coupled to the earpieces 726a, 726b in order to facilitate positioning the lenses proximate eyes of the user. The wearable electronic device 701 can further include a user interface 731, such as a display, to provide information to the user. In one aspect, a handling portion 711 can comprise a portion of at least one of the earpieces 726a, 726b. A user authentication sensor 713 can be associated with the handling portion 711 and configured to sense a biometric characteristic as the user dons the wearable electronic device 701 by positioning the earpiece behind an ear of the user. Thus, the user authentication sensor 713 can be located on a portion of the wearable electronic device 701 other than the user interface 731 of the device.

In one aspect, the user interface 731 can be used to authenticate the user by sensing a biometric characteristic. For example, the user interface 731 can utilize an ocular-based technology, such as iris recognition, retina scanning, and eye printing, to authenticate the user. Such authentication may occur instead of, or in addition to, authentication using the sensor 713.

EXAMPLES

The following examples pertain to further embodiments.

In one embodiment, a wearable electronic device can comprise a handling portion that facilitates donning the wearable electronic device on a user, a user authentication sensor associated with the handling portion and configured to sense a biometric characteristic of the user while the user is donning the wearable electronic device, and a security module to determine whether the sensed biometric characteristic indicates an authorized user of the wearable electronic device.

In one embodiment, the user authentication sensor is configured to sense the biometric characteristic in response to an action taken by the user to don the wearable electronic device.

In one embodiment, the action taken by the user to don the wearable device is a natural motion by the user in donning the wearable device.

In one embodiment, the user authentication sensor is located on the handling portion to facilitate sensing of at least a portion of a hand of the user as the user manipulates the wearable electronic device in donning the device.

In one embodiment, the handling portion comprises a coupling portion of the wearable electronic device that facilitates maintaining the device about the user.

In one embodiment, the user authentication sensor is located on a portion of the wearable electronic device other than a user interface of the device.

In one embodiment, the user authentication sensor comprises a fingerprint sensor, an optical sensor, a camera, an ultrasonic sensor, a capacitance sensor, a passive capacitance sensor, an active capacitance sensor, an iris pattern sensor or a finger/palm vein pattern sensor.

In one embodiment, the handling portion comprises at least a portion of a watch, a bracelet, a wristband, an arm band, a ring, an eyeglass, a pair of eyeglasses, a goggle, a pair of goggles, a health tracker, an activity tracker, a headband, a headset, a headphone, an earbud, a hat, a cap, a helmet, a wig, a hairpiece, a pant, a short, a skirt, a blouse, a dress, a shirt, a jacket, a coat, a vest, a shoe, a boot, a slipper, a necktie, a belt, a sock, an undergarment, an earring, a necklace, a backpack, a purse, a hearing aid, body jewelry, or combinations thereof.

In one embodiment, the wearable electronic device further comprises a wear status indicator module to determine whether the wearable electronic device is being worn, wherein the security module is configured to deny authorization when the wearable electronic device is not worn.

In one embodiment, the wearable electronic device further comprises a timer to enable authentication of the user when the wear status indicator indicates that the wearable electronic device is being worn within a predetermined time period following the receipt of the biometric information by the user authentication sensor.

In one embodiment, the wearable electronic device further comprises a wristband to facilitate securing the wearable electronic device about a wrist of the user, wherein the handling portion comprises at least a portion of the wristband.

In one embodiment, the wearable electronic device further comprises a wristband and a clasp operable with the wristband to secure the wearable electronic device about a wrist of the user, wherein the handling portion comprises at least a portion of one or more of the wristband and the clasp.

In one embodiment, the wearable electronic device further comprises a wear status indicator module to determine whether the wearable electronic device is being worn, wherein the security module is configured to deny authorization when the wearable electronic device is not worn.

In one embodiment, the clasp has an open position and a closed position, and wherein the wear status indicator module indicates that the wearable electronic device is being worn when the clasp is in the closed position.

In one embodiment, the wear status indicator module comprises a general-purpose input/output (GPIO) pin associated with the clasp to determine whether the clasp is in the closed position.

In one embodiment, the wearable electronic device further comprises a timer to enable authentication of the user when the wear status indicator indicates that the wearable electronic device is being worn within a predetermined time period following the sensing of the biometric information by the user authentication sensor.

In one embodiment, a sensing direction of the user authentication sensor is directed outwardly from the one or more of the wristband and the clasp to facilitate exposure of a digit of the user to the user authentication sensor when donning the wearable electronic device.

In one embodiment, the user authentication sensor is disposed on an external portion of the one or more of the wristband and the clasp.

In one embodiment, the wearable electronic device further comprises a wristband and a buckle operable with the wristband to secure the wearable electronic device about a wrist of the user, wherein the handling portion comprises at least a portion of one or more of the wristband and the buckle.

In one embodiment, the wearable electronic device further comprises a pair of lenses and a pair of earpieces coupled thereto in order to facilitate positioning the lenses proximate eyes of the user, wherein the handling portion comprises a portion of at least one of the earpieces.

In one embodiment, the wearable electronic device further comprises a headband or an earpiece to facilitate securing the wearable electronic device about a head of the user, wherein the handling portion comprises at least a portion of the headband or earpiece.

In one embodiment, the wearable electronic device further comprises an ear speaker coupled to the headband or earpiece configured to be proximate an ear of the user.

In one embodiment, the wearable electronic device further comprises an earphone coupled to the headband, the earphone being operable with the headband to facilitate positioning the ear speaker proximate the ear of the user, wherein the handling portion comprises a portion of at least one of the headband and the earphone.

In one embodiment, the wearable electronic device further comprises a microphone coupled to the headband or earpiece.

In one embodiment, the wearable electronic device further comprises a microphone boom coupling the microphone to the headband or earpiece, the microphone boom being operable to facilitate positioning the microphone proximate a mouth of the user, wherein the handling portion comprises a portion of at least one of the headband or earpiece and the microphone boom.

In one embodiment, an electronic device authentication system comprises a first electronic device, and a second electronic device as recited above configured to communicate with the first electronic device.

In one embodiment, upon authentication of the user, the second electronic device initiates an action with the first electronic device.

In one embodiment, the action comprises pairing, checking emails/messages/alerts, sending sensory inputs to the first electronic device for further processing, or combinations thereof.

In one embodiment, the first electronic device comprises a mobile device.

In one embodiment, a method of authenticating a user of a wearable electronic device comprises presenting to a portion of a user's body, a wearable electronic device having a handling portion that facilitates donning the wearable electronic device by a user, a user authentication sensor associated with the handling portion and configured to sense a biometric characteristic of the user while the user is donning the wearable electronic device, and a security module to determine whether the sensed biometric characteristic indicates an authorized user of the wearable electronic device. The method also comprises donning the wearable electronic device on the user, wherein the biometric characteristic is sensed to initiate authentication of the user.

In one embodiment, the wearable electronic device further comprises a wristband and a clasp operable with the wristband to secure the wearable electronic device about the wrist, and wherein the handling portion comprises a portion of at least one of the wristband and the clasp.

In one embodiment, donning the wearable electronic device comprises closing the clasp.

In one embodiment, the clasp has an open position and a closed position, and wherein the closed position enables authentication of the user.

In one embodiment, the clasp comprises a general-purpose input/output (GPIO) pin to determine whether the clasp is in the closed position.

In one embodiment, the wearable electronic device further comprises a timer to enable authentication of the user when the clasp is in the closed position within a predetermined time period following initiation of user authentication.

In one embodiment, a method of facilitating user authentication to use a wearable electronic device comprises presenting to a portion of a user's body, a wearable electronic device having a handling portion that facilitates donning the wearable electronic device by a user. The method also comprises facilitating authentication of the user in response to an action taken by the user to don the wearable electronic device.

In one embodiment, facilitating authentication of the user comprises associating a user authentication sensor with the handling portion.

In one embodiment, a method of protecting the privacy of a wearable electronic device comprises obtaining a wearable electronic device having a handling portion that facilitates donning the wearable electronic device by a user. The method also comprises adding a user authentication sensor to the handling portion to authenticate the user in response to an action taken by the user to don the wearable electronic device.

An exemplary embodiment provides a method of authenticating a user of a wearable electronic device including: providing a device as recited herein, presenting the device to a portion of a user's body on which the device is to be worn, and donning the wearable electronic device on the user, wherein the biometric characteristic is sensed to initiate authentication of the user.

In one example, the wearable electronic device further comprises a wristband and a clasp operable with the wristband to secure the wearable electronic device about the wrist, and wherein the handling portion comprises a portion of at least one of the wristband and the clasp.

In one example, donning the wearable electronic device comprises closing the clasp.

In one example, the clasp has an open position and a closed position, and wherein the closed position enables authentication of the user.

In one example, the clasp comprises a general-purpose input/output (GPIO) pin to determine whether the clasp is in the closed position.

In one example, the wearable electronic device further comprises a timer to enable authentication of the user when the clasp is in the closed position within a predetermined time period following initiation of user authentication.

An exemplary embodiment provides a method of facilitating user authentication to use a wearable electronic device, that includes providing a device as recited herein to a user, and allowing the user to don the device.

In one example, facilitating authentication of the user comprises associating a user authentication sensor with the handling portion.

An exemplary embodiments provides a method of protecting the privacy of a wearable electronic device, that includes configuring a handling portion of the device with a user authentication sensor that authenticates the user in response to an action taken by the user to don the wearable electronic device.

In one example, the device is a smart watch and the handling portion is a wristband.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one invention embodiment. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various invention embodiments and examples may be referred to herein along with alternatives for the various components thereof. It is understood that such embodiments, examples, and alternatives are not to be construed as de facto equivalents of one another, but are to be considered as separate and autonomous.

Furthermore, the described features, structures, or characteristics may be combined in any suitable manner in one or more embodiments. In this description, numerous specific details are provided, such as examples of layouts, distances, network examples, etc. One skilled in the relevant art will recognize, however, that many variations are possible without one or more of the specific details, or with other methods, components, layouts, measurements, etc. In other instances, well-known structures, materials, or operations are not shown or described in detail but are considered well within the scope of the disclosure.

While the forgoing examples are illustrative of the specific embodiments in one or more particular applications, it will be apparent to those of ordinary skill in the art that numerous modifications in form, usage and details of implementation can be made without departing from the principles and concepts articulated herein. Accordingly, no limitation is intended except as by the claims set forth below.

What is claimed is:

1. A wearable electronic apparatus, comprising:
a wearable ring;
a battery supported by the wearable ring;
communications circuitry supported by the wearable ring, the communications circuitry to communicate information between the wearable ring and one or more external devices;
a fingerprint sensor supported by the wearable ring, the fingerprint sensor to detect a fingerprint of the user as the user dons the wearable ring;
memory circuitry supported by the wearable ring, the memory circuitry to store information representative of a fingerprint of an authorized user of the wearable ring; and
security circuitry supported by the wearable ring, the security circuitry to determine whether the detected fingerprint matches the stored information representative of the fingerprint of the authorized user of the wearable ring;
wherein the communications circuitry is to communicate the information between the wearable ring and the one or more external devices based on the determination that the detected fingerprint matches the stored information representative of the fingerprint of the authorized user of the wearable ring.

2. The wearable electronic apparatus of claim 1, comprising:
wear status indicator circuitry supported by the wearable ring, the wear status indicator circuitry to detect a presence of the user's finger within the wearable ring;
wherein the security circuitry is to cause the communications circuitry to communicate information between the wearable ring and one or more external devices based on:
the determination that the detected fingerprint matches the stored information representative of the fingerprint of the authorized user of the wearable ring; and
the detection of the presence of the user's finger within the wearable ring.

3. The wearable electronic apparatus of claim 2 wherein user authorization is denied when the wear status indicator circuitry fails to detect a presence of the user's finger within the wearable ring.

4. The wearable electronic apparatus of claim 2, wherein the battery is to provide power to at least one of: the fingerprint sensor, the wear status indicator circuitry, the memory circuitry, the communications circuitry, or the security circuitry.

5. The wearable electronic apparatus of claim 1, comprising:
an optical sensor supported by the wearable ring.

6. The wearable electronic apparatus of claim 1 wherein the communications circuitry includes radio frequency transmitter circuitry to communicate the information between the wearable ring and the one or more external devices.

7. A system, comprising:
memory circuitry to store information representative of a fingerprint of an authorized user of a wearable ring;
means for sensing a fingerprint of a user's finger as the user dons the wearable ring;
means for determining whether data representative of the sensed fingerprint matches the stored information representative of the fingerprint of the authorized user of the wearable ring; and
means for communicating information between the wearable ring and one or more external devices based on the determination that the data representative of the sensed fingerprint matches the stored information representative of the fingerprint of the authorized user of the wearable ring.

8. The system of claim 7, comprising:
means for receiving information indicative of a presence of a user's finger within the wearable ring;
wherein the means for communicating the information between the wearable ring and the one or more external devices includes:
means for causing communications circuitry to communicate information between the ring and one or more external devices responsive to:
the determination that the data representative of the sensed fingerprint matches the stored information representative of the fingerprint of the authorized user of the wearable ring; and
the information indicative of a presence of the user's finger within the wearable ring.

9. The system of claim 8 wherein the means for receiving information indicative of a presence of a user's finger within the wearable ring comprises:
optical means for detecting the presence of the user's finger within the wearable ring.

10. The system of claim 9 wherein the means for communicating information between the wearable ring and the one or more external devices comprises:
radio frequency means for communicating information between the wearable ring and one or more external devices.

11. One or more non-transitory machine-readable storage devices comprising instructions that, when executed by processor circuitry supported by a wearable ring, cause the processor circuitry to:
determine whether data representative of a fingerprint of a user from a fingerprint sensor matches information representative of a fingerprint of an authorized user of the wearable ring, wherein the fingerprint sensor is to sense the fingerprint of the user as the user dons the wearable ring, and wherein memory circuitry supported by the wearable ring is to store the information representative of the fingerprint of the authorized user of the wearable ring; and
communicate information between the wearable ring and one or more external devices based on the determination that the data representative of the fingerprint from the fingerprint sensor matches the stored information representative of the fingerprint of the authorized user of the wearable ring.

12. The one or more non-transitory machine-readable storage devices of claim 11 comprising instructions that, when executed by the processor circuitry, cause the processor circuitry to:
detect via wear status indicator circuitry a presence of a user's finger in the wearable ring;
wherein the instructions that cause the processor circuitry to communicate the information between the wearable ring and the one or more external devices cause the processor circuitry to:
communicate information between the wearable ring and the one or more external devices based on:

the determination that the data representative of the fingerprint from the fingerprint sensor matches the stored information representative of the fingerprint of the authorized user of the wearable ring; and the detection of the presence of the user's finger in the wearable ring.

13. The one or more non-transitory machine-readable storage devices of claim 12 wherein the instructions that cause the processor circuitry to detect via the wear status indicator circuitry the presence of the user's finger in the wearable ring cause the processor circuitry to:

detect, via an optical sensor, the presence of the user's finger in the wearable ring.

14. The one or more non-transitory machine-readable storage devices of claim 11 wherein the instructions that cause the processor circuitry to communicate information between the wearable ring and one or more external devices causes the processor circuitry to:

communicate, via radio frequency communications circuitry, information between the wearable ring and the one or more external devices.

* * * * *